Feb. 27, 1968            J. SCHRALL            3,370,863

STEERABLE SLEIGH OR STEERABLE TOBOGGAN

Filed March 17, 1966            2 Sheets-Sheet 1

INVENTOR
JOSEF SCHRALL

BY Michael S. Striker

ATTORNEY

Feb. 27, 1968    J. SCHRALL    3,370,863
STEERABLE SLEIGH OR STEERABLE TOBOGGAN
Filed March 17, 1966    2 Sheets-Sheet 2

INVENTOR
JOSEF SCHRALL
BY Michael S. Striker
ATTORNEY

United States Patent Office
3,370,863
Patented Feb. 27, 1968

3,370,863
STEERABLE SLEIGH OR STEERABLE
TOBOGGAN
Josef Schrail, 1 Fritz-Platz, 817 Bad Tolz, Germany
Filed Mar. 17, 1966, Ser. No. 535,661
Claims priority, application Germany, Mar. 18, 1965,
Sch 36,725; Mar. 11, 1966, Sch 38,649
8 Claims. (Cl. 280—21)

ABSTRACT OF THE DISCLOSURE

A steerable sleigh having two runners which have upwardly bent front portions and which are inclined towards one another in forward direction. The runners are secured to the frame of the sleigh so that they can be tilted about respective longitudinally extending axes which are closer to the respective inner edge of each runner than to the respective outer edge of the same runner.

Figure 1:
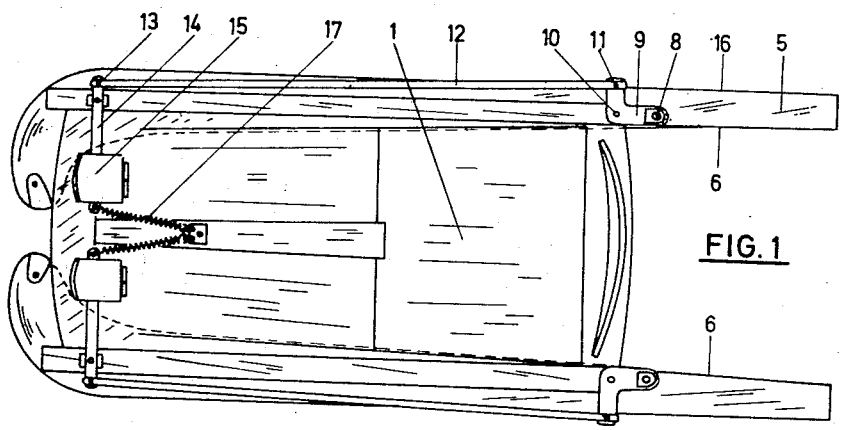

The present invention relates to a steerable sleigh with two runners. In the sleighs of this type known up to now special steering runners are provided which are articulated at the front of the ordinary runners.

As compared with this prior art the sleigh according to the invention does not need any special steering runners because its two ski-type broad runners are bent at the front towards the interior and upward and are fastened on the slide frame in such a way that they can be tilted around their straight inner edge with the outer edge moving upward. Thereby it is possible to run, to steer and to brake with the runners in a manner similar to that of a skier with his skis. If indeed the right-hand runner is canted in the described manner a steering effect towards the left is reached, if the left-hand runner is canted in the described manner a steering effect towards the right is obtained and if both runners are canted simultaneously in the described manner a braking effect is obtained similar to that of the known snowplow of the skier.

In order to increase still further the steering and braking effect the straight inner edges of the runners may form in their neutral position an acute angle at their front. When canting the runner the angle of the leading inner edge is tilted stronger against the longitudinal axis then would be the case if the inner edge would lie parallel to each other in their neutral position.

As the sleigh will sink in relatively deeply in soft snow because of its weight and its load it has been proved suitable to have the runners become wider from the rear towards the front and to let them end in a broad bluntly rounded off-point. Thereby the front of the sleigh is lifted better out of the soft snow than would be the case with normal runners, but particularly the steering effect is considerably improved. The runners may be tiltable around hinges fastened on the frame of the sleigh. Thereby the hinges may attack on two intermediate pieces connected firmly with the runners and each intermediate piece may be rigidly connected with a runner by means of a spacer. By such an arrangement the guiding interior edge of the runner is offset relatively far from the tilting axis in the hinges, whereby the movement of the runner and thus the steering effect is enhanced.

The runners may be each tiltable each one separately by means of co-ordinated hand- and/or foot levers via linkage and reversing elements. Thereby the arrangement can be simplified by having the linkages of the hand and foot lever engaging each runner on common reversing elements.

A tension spring for pulling back the tilted runners in their neutral position may be provided for each runner so that when the steering stress attacking on the hand or foot levers respectively is decreased the runners return automatically and singly in their neutral position for normal straight running.

In other embodiment of the invention which can be made more easily and rationally in series production a guide piece connected rigidly with the runner is carried tiltably in a projection connected rigidly with the sleigh frame, on or in which guide piece a tilting element is connected which can be pivoted around an axle directed at an acute angle to the longitudinal direction of the runner and which can be tilted simultaneously around the guide piece outward and upward by means of a hand or foot operation. This design avoids the different return elements which are necessary in the design as described herein before and fulfills inspite of this the same purpose with the same safety of the steering effect. By the elimination of the different articulations the susceptibility against breakdown or trouble is lower.

An open yoke connected rigidly with the sleigh frame may serve as a projection, whereby the guide piece is pivotably carried in its free ends. A tube may be provided as a guide piece which tube has an oblique passage for receiving a bearing for the bolt-shaped tilting elements.

The tilting elements may be configurated as an iron rod bent at an acute angle, the lower leg of which can be moved in the guide piece and the upper leg of which is formed as a handle or arranged for fastening a foot control and can be moved in a slide guide fastened on the sleigh frame about parallely to the longitudinal axis of the sleigh.

On the leg of the tilting elements serving as a handle or for connecting a foot control a tension spring may be connected which returns the tilted runners in the neutral position. For the foot control linkage or a cable connection may be provided, whereby force for the foot control attacks on the tilting elements against the load of the tension spring.

The front ends of the runners may be bent in longitudinal direction of the sleigh as well as also simultaneously transverse to it concavely upward.

Some embodiments of the invention are shown diagrammatically in the illustrations and described hereinafter without the invention being limited to these embodiments.

Figure 2:
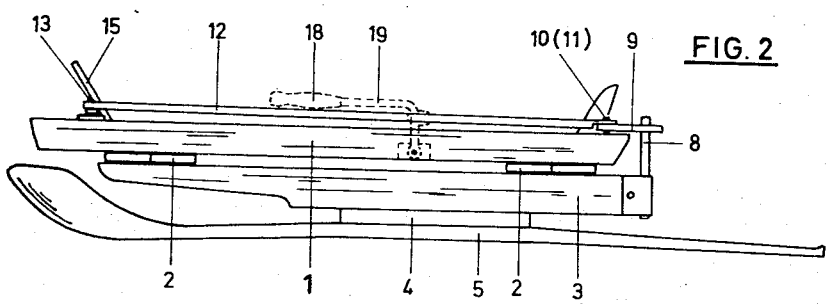
Figure 3:
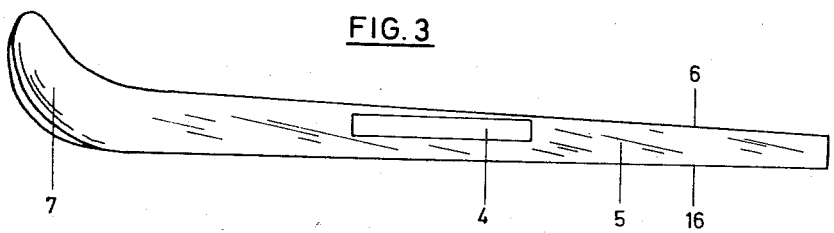
Figure 4:
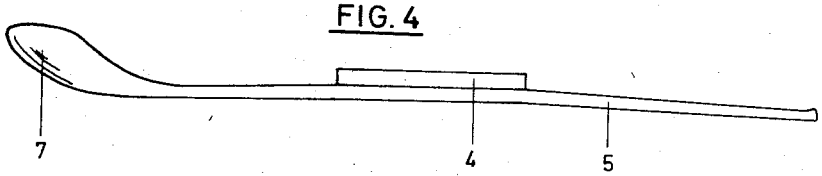
Figure 5:
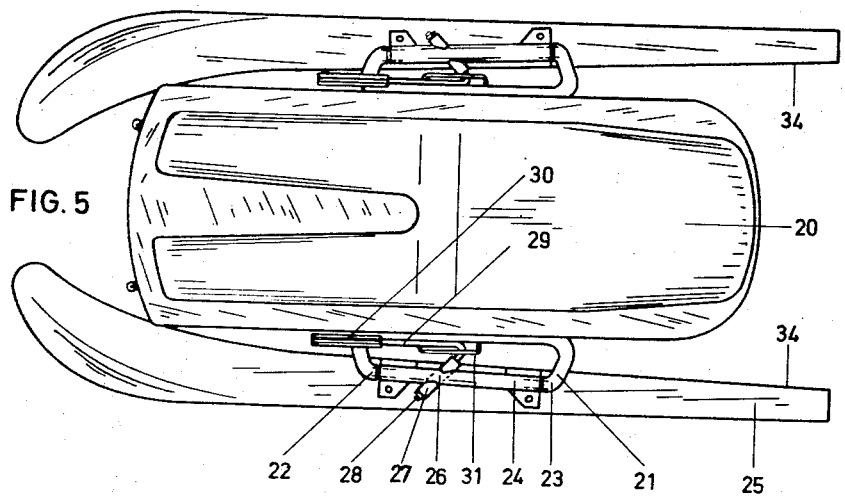
Figure 6:
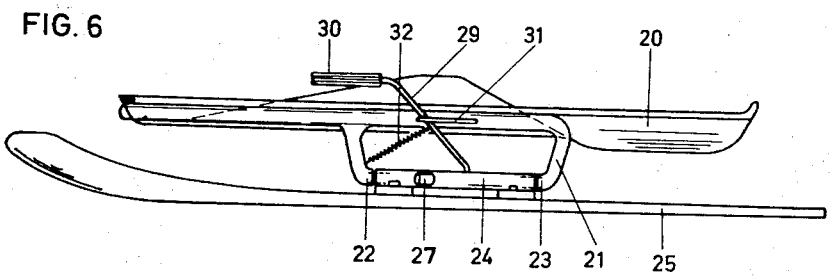
Figure 7:
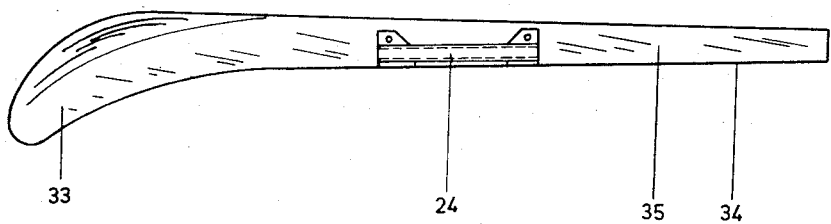
Figure 8:
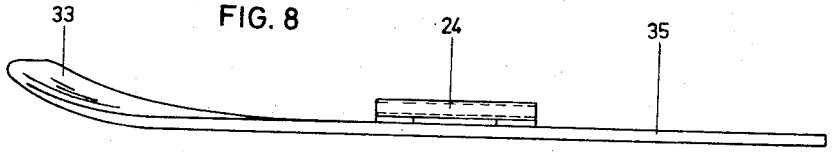

FIG. 1 shows the sleigh in plan view,
FIG. 2 shows it in lateral elevation,
FIG. 3 shows the plan view on a single runner and
FIG. 4 its side elevation,
FIG. 5 shows another embodiment of the sleigh in plan view,
FIG. 6 shows the same embodiment in side elevation,
FIG. 7 shows a plan view on a single runner, and
FIG. 8 is a side elevation of the said runner.

On the sleigh frame 1 hinges 2 are fixed on both sides in front and in the rear, which hinges connect the sleigh frame 1 in an articulate manner with one intermediate piece 3 each. The intermediate pieces 3 are rigidly connected with one runner 5 each by means of one spacer 4 each.

The inner edges 6 of the two runners form from the rear towards the front an acute angle with each other. The runners 5 become gradually wider from the rear towards the front and end in the front in a broad bluntly rounded off point 7.

Each of the members 3 has secured thereto an angle 9 by means of a spacer bolt 8 about which such angle 9 is turnable. A pin defining an axle 10, about which the angle 9 is turnable, secures the angle to the frame 1. A link 12 is connected at one end to the angle 9 turnable about the axis 11; at its other end the link 12 is articulated to the axle 13 on which a foot lever 14 is pivotably mounted. A pedal 15 is secured to the lever 14 and when the pedal 15 is pressed forward, the pressure transmitted to the intermediate member via the just described linkage causes the intermediate member 13 and the runner 5, which is connected thereto, to be tilted outwardly so that the inner edge 6 is pressed downward while the outer edge 16 is lifted.

Because of this tilting of the runner the sleigh does not run any more on the broad surface of the runner but essentially on the inner edge 6 which is transverse to the longitudinal axis and thus exerts a steering effect. If the left-hand runner is tilted on the inner edge 6 the sleigh makes a curve towards the right, while a tilting of the right-hand runner on the inner edge 6 makes the sleigh turn towards the left. If both runners are tilted on their inner edge 6 the runners are in a braking position corresponding to the snowplow of the skier. By the points of the two runners which run in front towards the interior the steering effect is considerably improved.

With each foot lever 14 a spring 17 is connected which brings back the runner 5 in question in its normal position as soon as the pressure on the pedal decreases.

In order to be able to carry out the control also by hand a hand lever 18 may be provided which attacks likewise on the returning angle 9 by means of an intermediate linkage 19.

In the embodiment as shown in FIGURE 5 or 8 the sleigh frame 20 has rigidly connected to each of its sides a projection in the form of an open yoke 21 which resembles a letter C whose open side faces in downward direction and a guide piece 24 is rotatably mounted in the free extremities of each yoke 21. Each such guide piece 24 is further rigidly connected with the appropriate runner 25.

Each guide piece 24 is constructed as a tube and provided with an oblique bore 26 (see FIG. 5) for receiving a bearing 27 for a bolt-shaped tilting element. This tilting element is embodied as an iron rod having a lower leg 28 which is rotatable in the bearing 27 and an upper leg 29 which defines with the lever by an acute angle and is provided with the handle 30 for a hand control. The upper leg 29 of the tilting element is guided for sliding movement in a slot defined by a yoke 31 which extend substantially parallel to the longitudinal axis of the sleigh.

A tension spring 32 is connected to the upper leg 29 of the tilting element, so that the tilted runners are urged back into their neutral position.

The front extremity 3 of the runners 25 may be bent in the longitudinal direction of the sleigh as well as simultaneously transversely and concavely upward so that they form a bowl which is gone somewhat obliquely towards the center axis of the sleigh and the inner edge of which improves considerably the steering effect.

If in the embodiment shown in the figures the right-hand hand lever 30 is pulled upward the right-hand runner is thereby tilted around the longitudinal direction of the lower leg 28 of the tilting element, whereby the inner edge 34 is pressed obliquely downward, so that it results in a guiding positioned at an angle to the longitudinal axis of the sleigh, so that it makes a left-hand curve. When the left-hand hand lever is pulled the sleigh makes correspondingly a right-hand curve and when both hand-levers 30 are pulled the runners pass into a braking snowplow position.

The control may also be reversed in such a way that with the right-hand or with the right-foot respectively the left-hand runner and with the left-hand or the left-foot respectively the right-hand runner is tilted, e.g. by corresponding cable connections. The runners of the sleigh, particularly the inner edges 34 can be provided with steel edges in a similar manner as this is known with skis.

As the material for the sleigh and particularly for the runners all materials suitable for skis may be used, particularly also glass fibre, plastic material and steel construction.

I claim:
1. A steerable sleigh comprising, in combination, an elongated supporting structure having opposite longitudinal sides; a pair of elongated runners each extending along one of said sides, each of said runners having an outwardly directed edge and an inwardly directed edge facing the other runner; mounting means mounting each of said runners on said supporting structure for independent tilting movement about an axis extending longitudinally of the respective runner and being laterally offset toward the inwardly directed edge of the same; and actuating means operatively associated with said runners for tilting the same independently of one another about the respective longitudinally extending axis from a normally planar position to an inclined position so as to effect elevating of the outwardly directed edge of a respective runner to a level higher than the inwardly directed edge of the same runner.

2. A sleigh as defined in claim 1, having a front end; said inwardly directed edges of the respective runners being substantially straight and being inclined towards one another in the direction of said front end.

3. A sleigh as defined in claim 1, wherein said runners each have a rounded front end portion and converge in width in the direction rearwardly from such rounded front end portion.

4. A sleigh as defined in claim 1, wherein said runners have front end portions extending inwardly one toward the other and concavely curved in upward direction.

5. A sleigh as defined in claim 1, wherein said mounting means comprises a pair of intermediate members each rigid with one of said runners and each tiltable about said longitudinally extending axis.

6. A sleigh as defined in claim 1, wherein said mounting means comprises a pair of intermediate members each rigid with said supporting structure and each connected to one of said runners for tilting movement of such runners relative to the respective intermediate member about said longitudinal axis.

7. A sleigh as defined in claim 1; and further comprising biasing means operatively associated with the respective runners and urging the respective runners to said normally planar position thereof.

8. A sleigh as defined in claim 1; wherein said actuating means comprises operator-operable engaging portions and linkage means operatively connecting to said engaging portions with the respective runners.

References Cited

UNITED STATES PATENTS

| | | | |
|---|---|---|---|
| 2,317,048 | 12/1940 | Fosbak | 280—31 |
| 2,354,627 | 7/1944 | Wheeler | 280—16 |
| 2,357,928 | 9/1944 | Bowen et al. | 280—21 |
| 2,620,199 | 12/1952 | Maly et al. | 280—21 |
| 3,107,923 | 10/1963 | Nuss | 280—21 |
| 3,190,671 | 6/1965 | Fabris | 280—21 |

FOREIGN PATENTS

| | | |
|---|---|---|
| 149,393 | 12/1936 | Austria. |
| 1,083,261 | 1/1955 | France. |
| 467,025 | 11/1951 | Italy. |
| 296,869 | 2/1954 | Switzerland. |

LEO FRIAGLIA, *Primary Examiner.*

BENJAMIN HERSH, *Examiner.*

L. D. MORRIS, *Assistant Examiner.*